US012538320B2

(12) United States Patent
Yang

(10) Patent No.: US 12,538,320 B2
(45) Date of Patent: Jan. 27, 2026

(54) BEAM INDICATION METHOD, NETWORK SIDE DEVICE, AND TERMINAL

(71) Applicant: VIVO MOBILE COMMUNICATION CO., LTD., Guangdong (CN)

(72) Inventor: Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 382 days.

(21) Appl. No.: 18/192,877

(22) Filed: Mar. 30, 2023

(65) Prior Publication Data

US 2023/0239895 A1    Jul. 27, 2023

Related U.S. Application Data

(63) Continuation of application No. PCT/CN2021/121838, filed on Sep. 29, 2021.

(30) Foreign Application Priority Data

Sep. 30, 2020 (CN) .......................... 202011066307.3

(51) Int. Cl.
*H04W 72/23* (2023.01)
*H04L 5/00* (2006.01)
*H04W 72/044* (2023.01)
*H04W 72/1263* (2023.01)

(52) U.S. Cl.
CPC .......... *H04W 72/23* (2023.01); *H04L 5/0055* (2013.01); *H04W 72/046* (2013.01); *H04W 72/1263* (2013.01)

(58) Field of Classification Search
CPC ............... H04W 72/23; H04W 72/046; H04W 72/1263; H04L 5/0055; H04L 5/0023; H04L 5/0048; H04L 5/0091; H04L 5/0053; H04B 7/06952
See application file for complete search history.

(56) References Cited

U.S. PATENT DOCUMENTS

| 11,356,222 | B2 | 6/2022 | Gao et al. |
| 2018/0227886 | A1 | 8/2018 | Chou et al. |
| 2018/0234959 | A1* | 8/2018 | Ahn ...................... H04W 72/20 |
| 2020/0260475 | A1 | 8/2020 | Yoshimura et al. |
| 2020/0344012 | A1* | 10/2020 | Karaki .................. H04L 1/1812 |
| 2021/0153209 | A1 | 5/2021 | Guan et al. |

(Continued)

FOREIGN PATENT DOCUMENTS

| CN | 108092754 A | 5/2018 |
| CN | 110536452 A | 12/2019 |

(Continued)

OTHER PUBLICATIONS

International Search Report and Written Opinion of the International Searching Authority regarding International Patent Application No. PCT/CN2021/121838, dated Dec. 30, 2021. Translation provided by Bohui Intellectual Property.

(Continued)

*Primary Examiner* — Kiet Tang
(74) *Attorney, Agent, or Firm* — Harness, Dickey & Pierce, P.L.C.

(57) ABSTRACT

A beam indication method includes: receiving first DCI or a first MAC CE. The first DCI or the first MAC CE is used to indicate at least one piece of common beam information.

19 Claims, 4 Drawing Sheets

(56) References Cited

U.S. PATENT DOCUMENTS

2022/0330221 A1  10/2022  Pan et al.
2023/0319608 A1* 10/2023  Matsumura ........... H04L 5/0053
                                                    370/252

FOREIGN PATENT DOCUMENTS

| CN | 110809321 A | 2/2020 |
| CN | 111357239 A | 6/2020 |
| EP | 4106286 A1 | 12/2022 |
| JP | 2019-047375 A | 3/2019 |

OTHER PUBLICATIONS

"Remaining issues on beam management," AUSUSTeK, 3GPP TSG RAN WG1 Meeting #93, R1-1807210, dated May 25, 2018.
First Office Action regarding Japanese Patent Application No. 2023-519859, dated Mar. 11, 2024.
Extended European Search Report for European Patent Application No. 21874651.0 dated Feb. 8, 2024.
Huawei, HiSilicon, "Enhancements on multi-beam operation in Rel-17," Document R1-2005246, 3GPP TSG RAN WG1 Meeting #102-e, dated Aug. 8, 2020.
First Office Action regarding Chinese Patent Application No. 202011066307.3, dated Jan. 20, 2025. Translation provided by Bohui Intellectual Property.
"Discussion on beam measurement, beam reporting and beam indication," vivo, 3GPP TSG RAN WG1 NR Ad Hoc #3, R1-1715619, dated Sep. 18-21, 2017.

* cited by examiner

BEAM INDICATION METHOD, NETWORK SIDE DEVICE, AND TERMINAL

CROSS-REFERENCE TO RELATED APPLICATIONS

This application is a Bypass Continuation application of PCT/CN2021/121838 filed on Sep. 29, 2021, which claims priority to Chinese Patent Application No. 202011066307.3 filed on Sep. 30, 2020, which are incorporated herein by reference in their entirety.

TECHNICAL FIELD

This application pertains to the field of communications technologies, and in particular, relates to a beam indication method and apparatus, a network-side device, and a terminal.

BACKGROUND

Analog beamforming features full-band transmission, and array elements in each polarization direction on a panel of each high-frequency antenna array can transmit only analog beams in a time division multiplexing mode. A beamforming weight for each analog beam is implemented by adjusting parameters of radio frequency front-end devices such as a phase shifter.

SUMMARY

According to a first aspect, an embodiment of this application provides a beam indication method, applied to a network-side device. The method includes:
  transmitting first downlink control information (DCI) or a first medium access control control element (MAC CE), where the first DCI or the first MAC CE is used to indicate at least one piece of common beam information, where
  the common beam information corresponds to at least two channels, or the common beam information corresponds to at least two reference signals, or the common beam information corresponds to at least one channel and at least one reference signal.

According to a second aspect, an embodiment of this application provides a beam indication method, applied to a terminal. The method includes:
  receiving first downlink control information (DCI) or a first medium access control control element (MAC CE), where the first DCI or the first MAC CE is used to indicate at least one piece of common beam information, where
  the common beam information corresponds to at least two channels, or the common beam information corresponds to at least two reference signals, or the common beam information corresponds to at least one channel and at least one reference signal.

According to a third aspect, an embodiment of this application provides a beam indication apparatus, applied to a network-side device. The apparatus includes:
  a transmitting module, configured to transmit first downlink control information (DCI) or a first medium access control control element (MAC CE), where the first DCI or the first MAC CE is used to indicate at least one piece of common beam information, where
  the common beam information corresponds to at least two channels, or the common beam information corresponds to at least two reference signals, or the common beam information corresponds to at least one channel and at least one reference signal.

According to a fourth aspect, an embodiment of this application provides a beam indication apparatus, applied to a terminal. The apparatus includes:
  a receiving module, configured to receive first downlink control information (DCI) or a first medium access control control element (MAC CE), where the first DCI or the first MAC CE is used to indicate at least one piece of common beam information, where
  the common beam information corresponds to at least two channels, or the common beam information corresponds to at least two reference signals, or the common beam information corresponds to at least one channel and at least one reference signal.

According to a fifth aspect, an embodiment of this application provides a network-side device. The network-side device includes a processor, a memory, and a program or instructions stored in the memory and executable on the processor. When the program or instructions are executed by the processor, the step of the method according to the first aspect is implemented.

According to a sixth aspect, an embodiment of this application provides a terminal. The terminal includes a processor, a memory, and a program or instructions stored in the memory and executable on the processor. When the program or instructions are executed by the processor, the step of the method according to the second aspect is implemented.

According to a seventh aspect, an embodiment of this application provides a non-transitory computer-readable storage medium. The non-transitory computer-readable storage medium stores a program or instructions. When the program or instructions are executed by a processor, the step of the method according to the first aspect is implemented, or the step of the method according to the second aspect is implemented.

According to an eighth aspect, an embodiment of this application provides a chip. The chip includes a processor and a communications interface. The communications interface is coupled to the processor. The processor is configured to execute a program or instructions to implement the method according to the first aspect or implement the method according to the second aspect.

According to a ninth aspect, an embodiment of this application provides a computer program product stored in a non-transitory computer-readable storage medium. The computer program product is executed by at least one processor to implement the method according to the first aspect or implement the method according to the second aspect.

According to a tenth aspect, an embodiment of this application provides a beam indication apparatus, configured to perform the method according to the first aspect or the method according to the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, a new radio (NR) system is described for an illustration purpose, and NR terms are used in most of the following descriptions, although these technologies may also be applied to other applications than an NR system application, for example, a 6th Generation (6G) communications system.

Figure 1:
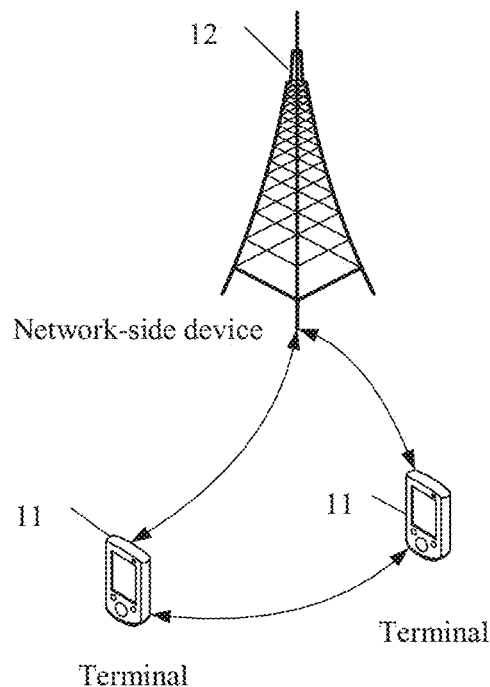
FIG. 1 is a block diagram of a wireless communications system to which the embodiments of this application are applicable.

FIG. 1 is a block diagram of a wireless communications system to which an embodiment of this application can be applied. The wireless communications system includes a terminal 11 and a network-side device 12. The terminal 11 may also be referred to as a terminal device or a user terminal (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a bracelet, a headset, a pair of glasses, or the like. It should be noted that a type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art, as long as the same technical effect is achieved. The base station is not limited to specific technical terms. It should be noted that in the embodiments of this application, only a base station in an NR system is used as an example, but a type of the base station is not limited.

It should be noted that "beam information" mentioned in the embodiments of this application may also be referred to as spatial relation information, spatial domain transmission filter information, spatial filter information, transmission configuration indicator (TCI) state information, quasi-co-location (QCL) information, or QCL parameters. This is not limited herein.

A beam indication method and apparatus, a network-side device, and a terminal provided in the embodiments of this application are hereinafter described by using embodiments and application scenarios thereof with reference to the accompanying drawings.

Currently, a polling mode is usually used to train an analog beamforming vector. That is, array elements in each polarization direction on each antenna panel take turns to transmit training signals (that is, candidate beamforming vectors) at prescribed times in the time division multiplexing mode. A terminal feeds back beam reports after performing measurement, so that a network side uses the training signals to implement emission of analog beams for the next service transmission. Content of beam reports usually includes identifiers of several optimal transmit beams and measured received power of each transmit beam.

After beam measurement and beam reporting, the network may provide a beam indication for a downlink/uplink channel or reference signal, where the beam indication is used to establish a beam link between the network and the terminal to implement channel or reference signal transmission. However, existing beam indication mechanisms for various channels and reference signals are different, and high signaling overheads are required.

Figure 2:
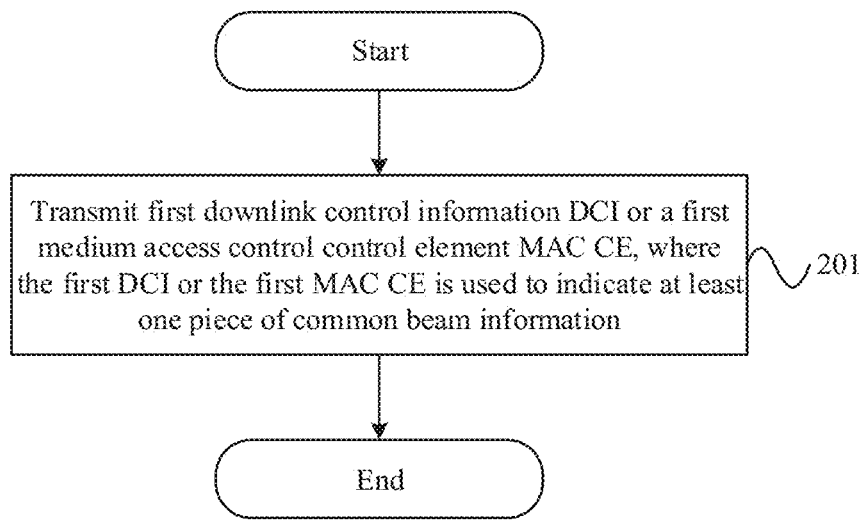
FIG. 2 is a first schematic diagram of steps of a beam indication method according to an embodiment of this application.

As shown in FIG. 2, an embodiment of this application provides a beam indication method. The method is applied to a network-side device and includes:

Step 201. Transmit first downlink control information DCI or a first medium access control control element MAC CE, where the first DCI or the first MAC CE is used to indicate at least one piece of common beam information.

The common beam information corresponds to at least two channels, or the common beam information corresponds to at least two reference signals, or the common beam information corresponds to at least one channel and at least one reference signal.

For example, the channel includes at least one of: a physical downlink shared channel (PDSCH), a physical uplink shared channel (PUSCH), a physical uplink control channel (PUCCH), or a physical downlink control channel (PDCCH); and the reference signal includes at least one of: a channel state information reference signal (CSI-RS) or a sounding reference signal (SRS).

It should be noted that if the first DCI or the first MAC CE indicates one piece of common beam information, the common beam information is applicable to all channels and reference signals of a corresponding terminal; or if the first DCI or the first MAC CE indicates at least two pieces of common beam information, each piece of common beam information corresponds to one type of channel or reference signal, where channels or reference signals may be classified into different types based on their functions or transmission directions. For example, one type is a data channel, another type is a control channel, and another type is a reference signal. In another example, one type is an uplink channel and an uplink reference signal, and one type is a downlink channel and a downlink reference signal. This is not limited herein.

In an optional embodiment of this application, the first DCI may be in a DCI format dedicated to indicating common beam information; or the first DCI may reuse an existing DCI format, such as a DCI format1_1, a DCI format1_0, a DCI format0_1, or a DCI format0_0.

In an optional embodiment of this application, the common beam information indicated by the first DCI or the first MAC CE is applicable to any one of the following:
  a first-type control resource set; and
  a first-type control resource set and a channel or reference signal associated with the first-type control resource set.

The channel or reference signal associated with the first-type control resource set includes at least one of:
  a channel or reference signal scheduled by DCI in the first-type control resource set, for example, a PDSCH, a PUSCH, or a CSI-RS; or
  a feedback channel corresponding to a channel scheduled by DCI in the first-type control resource set, for example, a PUCCH or a PUSCH.

In an optional embodiment, a control resource set in which the first DCI is located belongs to the first-type control resource set. In other words, the common beam information indicated by the first DCI is applicable to the first-type control resource set to which the control resource set in which the first DCI is located belongs.

In at least one optional embodiment of this application, the transmitting first downlink control information DCI in step 201 includes:
  transmitting a downlink control channel in a second-type control resource set, where the downlink control channel includes the first DCI, where
  beam information of the second-type control resource set is indicated by using a second MAC CE or a piece of DCI before the first DCI, or target beam information is indicated by using a second MAC CE or a piece of DCI before the first DCI, where the target beam information is beam information of the second-type control resource set and a channel or reference signal associated with the second-type control resource set.

In other words, the first DCI is carried on a PDCCH in the second-type control resource set, and the beam information (such as TCI state information) of the second-type control resource set is indicated by the second MAC CE, or indicated by the previous DCI of the first DCI.

In this embodiment of this application, before step 201, the method further includes:

determining the common beam information from a plurality of pieces of beam information configured by radio resource control RRC signaling, where for example, the network-side device selects one piece of beam information from the plurality of pieces of beam information configured by the RRC signaling as the common beam information; or determining the common beam information from a plurality of pieces of beam information activated by a third MAC CE, where for example, the network-side device selects one piece of beam information from the plurality of pieces of beam information activated by the third MAC CE as the common beam information.

In an optional embodiment, step 201 includes:
  in a case that a quantity of the at least one piece of common beam information satisfies a first condition, transmitting the first DCI; otherwise, transmitting the first MAC CE.

For example, if a quantity of common beam information to be indicated is less than (or equal to) a preset value, the common beam information is indicated by using the first DCI; or if a quantity of common beam information to be indicated is greater than (or equal to) a preset value, the common beam information is indicated by using the first MAC CE.

Optionally, at least one embodiment of this application further provides a feedback mechanism for the common beam information, that is, after step 201, the method further includes:
  receiving first feedback information transmitted by a terminal, where the first feedback information is used to indicate whether the terminal has correctly received the first DCI or the first MAC CE. For example, the first feedback information is hybrid automatic repeat request acknowledgement (HARQ-ACK) information. Optionally, the first feedback information is used to indicate whether the terminal has correctly received the common beam information. Optionally, the first feedback information may be carried on a PUCCH or a PUSCH.

In an optional embodiment, the method further includes:
  determining an uplink resource for the first feedback information in a first manner, where the first manner includes at least one of:
  determining the uplink resource for the first feedback information based on an uplink resource that is for the first feedback information and indicated in the first DCI or the first MAC CE, that is, the uplink resource for the first feedback information is directly carried in the first DCI or the first MAC CE;
  determining, based on a downlink resource in which the first DCI or the first MAC CE is located and an association relationship between uplink and downlink resources, that an uplink resource associated with the downlink resource in which the first DCI or the first MAC CE is located is the uplink resource for the first feedback information, that is, a preset association relationship exists between the downlink resource in which the first DCI or the first MAC CE is located and the corresponding uplink resource for the first feedback information; or
  determining, based on a transmission time of the first DCI or the first MAC CE and a preset timing relationship, that an uplink resource satisfying the preset timing relationship with the transmission time of the first DCI or the first MAC CE is the uplink resource for the first feedback information, that is, the preset timing relationship exists between the transmission time of the first DCI or the first MAC CE and the uplink resource for the first feedback information, for example, a first available uplink resource after preset duration counting from the transmission time of the first DCI or the first MAC CE is the uplink resource for the first feedback information.

It should be noted that the first DCI mentioned in this embodiment of this application may be DCI dedicated to indicating common beam information, or existing DCI may be used, for example, DCI for scheduling a PDSCH or DCI for scheduling a PUSCH.

In an optional embodiment, in a case that the first DCI is further used to schedule a physical downlink shared channel PDSCH, the method further includes:

receiving feedback information about the PDSCH.

The first feedback information and the feedback information about the PDSCH are jointly indicated in first target feedback information, that is, it is not distinguished which part of the first target feedback information is the first feedback information and which part of the first target feedback information is the feedback information about the PDSCH. The first target feedback information is one piece of feedback information. For example, the first target feedback information is one bit. When the bit is set to 1, the first target feedback information is an ACK. In this case, both the first feedback information and the feedback information about the PDSCH are ACKs. When the bit is set to 0, the first target feedback information is a NACK. In this case, at least one of the first feedback information or the feedback information about the PDSCH is a NACK, but the network cannot distinguish which piece of feedback information is a NACK.

Alternatively, the first feedback information and the feedback information about the PDSCH are separately indicated in second target feedback information, that is, it is not distinguished which part of the second target feedback information is the first feedback information and which part of the second target feedback information is the feedback information about the PDSCH. The second target feedback information includes two pieces of feedback information. For example, the second target feedback information is two bits, where the first bit corresponds to the first feedback information, and the second bit corresponds to the feedback information about the PDSCH. In this case, when the two bits are 10, the first feedback information is an ACK, and the feedback information about the PDSCH is a NACK; or when the two bits are 01, the first feedback information is a NACK, and the feedback information about the PDSCH is an ACK. Details are not exhaustively illustrated herein. In this case, the network can distinguish between the first feedback information and the feedback information about the PDSCH.

It should be noted that the first target feedback information or the second target feedback information may reuse feedback information about a PDSCH in a prior art; or feedback information about a PDSCH in a prior art is modified.

In another optional embodiment, in a case that the first DCI is further used to schedule a physical uplink shared channel PUSCH, there is no feedback information about the PUSCH, and the first feedback information is feedback information for the first DCI; and correspondingly, in this case, an uplink resource in which the first feedback information is located includes at least one of:

the PUSCH scheduled by the first DCI;

a PUSCH scheduled by second DCI, where the PUSCH scheduled by the second DCI and the PUSCH scheduled by the first DCI use a same HARQ process number;

a first available uplink resource after the PUSCH scheduled by the first DCI; or a first available uplink resource after the first DCI.

In this case, the network-side device may check whether a HARQ process number used by the PUSCH scheduled by the second DCI is the same as a HARQ process number used by the PUSCH scheduled by the first DCI, to determine whether the terminal has correctly received the first DCI. For example, if the PUSCH scheduled by the second DCI and the PUSCH scheduled by the first DCI use the same HARQ process number, the network-side device determines that the terminal has correctly received the first DCI; otherwise, the network-side device considers that the terminal has not correctly received the first DCI.

Referring to the foregoing example, in an optional embodiment, the method further includes at least one of the following.

In a case that the first feedback information is an acknowledgement (ACK), after first preset duration from a transmission time of the first feedback information, the common beam information is used for a channel or reference signal corresponding to the common beam information (which may also be referred to as "the common beam information becomes effective"). For example, the common beam information becomes effective after the first preset duration counting from the transmission time of the first feedback information being an ACK.

In a case that the first DCI is further used to schedule a physical uplink shared channel PUSCH, after second preset duration from a transmission time of second DCI, the common beam information is used for a channel or reference signal corresponding to the common beam information (which may also be referred to as "the common beam information becomes effective"), where the PUSCH scheduled by the second DCI and the PUSCH scheduled by the first DCI have a same hybrid automatic repeat request HARQ process number. For example, the common beam information becomes effective after the second preset duration counting from the transmission time of the second DCI used by the PUSCH that is newly scheduled by the network and that has the same HARQ process number as the PUSCH scheduled by the first DCI.

In at least one optional embodiment of this application, there may be a case that a transmission time of a channel or reference signal scheduled by a piece of DCI precedes a time at which the common beam information becomes effective. That is, if a transmission time of a channel or reference signal scheduled by third DCI precedes a time at which the common beam information can be used, the method further includes:

transmitting, by using first default beam information, the channel or reference signal scheduled by the third DCI, where the first default beam information includes:

beam information corresponding to the transmission time of the channel or reference signal scheduled by the third DCI; or beam information of a control resource set with a smallest ID.

The control resource set with the smallest ID may be: a control resource set with a lowest ID in all control resource sets in a current cell; a control resource set with a lowest ID in the first-type control resource set and the second-type control resource set; or a control resource set with a lowest ID in a type of control resource set to which a control resource set of the third DCI for scheduling the channel or reference signal belongs.

In another optional embodiment of this application, there may be a case that a transmission time of a piece of DCI precedes a time at which the common beam information becomes effective, but a transmission time of a channel or reference signal scheduled by the DCI follows the time at which the common beam information becomes effective. That is, if a transmission time of fourth DCI precedes a time at which the common beam information can be used, and a transmission time of a channel or reference signal scheduled by the fourth DCI follows the time at which the common beam information can be used, the method further includes:

transmitting, by using second default beam information, the channel or reference signal scheduled by the fourth DCI, where the second default beam information includes:

beam information corresponding to the transmission time of the fourth DCI;

beam information of a control resource set with a smallest ID; and the common beam information indicated by the first DCI or the first MAC CE.

It should be noted that "preceding a time at which the common beam information can be used" may also be referred to as "before the common beam information becomes effective", where an effective time of the common beam information includes any one of the following:

in a case that the first feedback information is an acknowledgement (ACK), after first preset duration from a transmission time of the first feedback information; and in a case that the first DCI is further used to schedule a physical uplink shared channel PUSCH, after second preset duration from a transmission time of second DCI.

The control resource set with the smallest ID may be: a control resource set with a lowest ID in all control resource sets in a current cell; a control resource set with a lowest ID in the first-type control resource set and the second-type control resource set; or a control resource set with a lowest ID in a type of control resource set to which a control resource set of the fourth DCI for scheduling the channel or reference signal belongs.

To ensure a robustness mechanism for the common beam information indicated by the first DCI or the first MAC CE, in at least one embodiment of this application, the method further includes:

in a case that the first feedback information is an acknowledgement, transmitting a corresponding channel or reference signal by using the common beam information;

or in a case that the first feedback information is a negative acknowledgement, retransmitting the first DCI or the first MAC CE indicating the at least one piece of common beam information.

Alternatively, the method further includes:

if the network-side device does not receive feedback information about the first DCI or the first MAC CE, retransmitting the first DCI or the first MAC CE indicating the at least one piece of common beam information.

That the network-side device does not receive feedback information about the first DCI or the first MAC CE includes two cases: The terminal transmits the corresponding feedback information but the network-side device does not receive the feedback information; and the terminal does not transmit the corresponding feedback information.

For example, in a case that the first DCI is only used to indicate the common beam information, a transmission time sequence between the network-side device and the terminal is:

first DCI→HARQ-ACK→PDSCH/PUSCH; or first DCI→HARQ-ACK→second DCI→PDSCH/PUSCH.

In another example, in a case that the first DCI is used to indicate the common beam information and also used to schedule a PDSCH, a transmission time sequence between the network-side device and the terminal is:

first DCI→PDSCH→HARQ-ACK, where the network-side device transmits the PDSCH by using the common beam information indicated in the first DCI.

In another example, in a case that the first DCI is used to indicate the common beam information and also used to schedule a PUSCH, a transmission time sequence between the network-side device and the terminal is:

first DCI→first PUSCH→second DCI→second PUSCH newly scheduled and having a same HARQ process number as the first PUSCH.

Optionally, in at least one embodiment of this application, in a case that the first feedback information and the feedback information about the PDSCH are jointly indicated in the first target feedback information, if the first target feedback information is an acknowledgement, both the first feedback information and the feedback information about the PDSCH are acknowledgements;

or if the first target feedback information is a negative acknowledgement, at least one of the first feedback information or the feedback information about the PDSCH is a negative acknowledgement.

In this embodiment of this application, it is not distinguished which part of the first target feedback information is the first feedback information and which part of the first target feedback information is the feedback information about the PDSCH. The first target feedback information is one piece of feedback information. For example, the first target feedback information is one bit. When the bit is set to 1, the first target feedback information is an ACK. In this case, both the first feedback information and the feedback information about the PDSCH are ACKs. When the bit is set to 0, the first target feedback information is a NACK. In this case, at least one of the first feedback information or the feedback information about the PDSCH is a NACK, but the network cannot distinguish which piece of feedback information is a NACK.

Optionally, in at least one embodiment of this application, in a case that the first feedback information and the feedback information about the PDSCH are separately indicated in the second target feedback information, the second target feedback information further includes first indication information, where the first indication information is used to indicate that the second target feedback information includes the first feedback information or the feedback information about the PDSCH; for example, HARQ-ACK information explicitly indicates that the information is the first feedback information or the feedback information about the PDSCH; optionally, the indication information is carried only when a NACK is fed back; in another example, the second target feedback information includes information related to an M1-bit feedback, where one bit (that is, second indication information) is added before the information related to the M1-bit feedback, and the bit is set to 1 to indicate that subsequent M1 bits are the first feedback information, or the bit is set to 0 to indicate that subsequent M1 bits are the feedback information about the PDSCH;

or the second target feedback information further includes second indication information, where the second indication information is used to indicate an arrangement order or position information of the first feedback information in the second target feedback information and the feedback information about the PDSCH in the second target feedback information; for example, the second target feedback information includes information related to an M2-bit feedback, one bit (that is, second indication information) is added before the information related to the M2-bit feedback, and the bit is set to 1 to indicate that first N1 bits in subsequent M2 bits are the first feedback information and that last N2 bits are the feedback information about the PDSCH, or the bit is set to 0 to indicate that first N1 bits in subsequent M2 bits are the feedback information about the PDSCH and that last N2 bits are the first feedback information;

or at least one of an uplink resource, timing information, a scrambling mode, a time/frequency domain offset, or a code division mode respectively used by the first feedback information and the feedback information about the PDSCH indicates that the second target feedback information includes the first feedback information or the feedback information about the PDSCH; feedback information on an uplink resource 1 is the first feedback information, and feedback information on an uplink resource 2 is the feedback information about the PDSCH;

or in the second target feedback information, the first feedback information and the feedback information about the PDSCH are separately encoded and arranged according to a preset rule; in this case, the network-side device may determine, based on an arrangement order, that the corresponding feedback information is the first feedback information or the feedback information about the PDSCH; for example, the first feedback information occupies first M3 bits, and the feedback information about the PDSCH occupies last M4 bits;

or in the second target feedback information, the first feedback information and the feedback information about the PDSCH are jointly encoded, where a decoding result of the joint encoding can indicate the first feedback information and the feedback information about the PDSCH that are included in the second target feedback information; for example, the second target feedback information is M5 bits; assuming that M5 is equal to 2, as indicated by a preset encoding rule, a decoding result "01" indicates that the first feedback information and the feedback information about the PDSCH are both ACKs, and a decoding result "10" indicates that the first feedback information is an ACK and that the feedback information about the PDSCH is a NACK; details are not exhaustively illustrated herein.

In an optional embodiment, the receiving first feedback information transmitted by a terminal includes:

receiving the first feedback information transmitted by the terminal by using current beam information (which may also be referred to as original beam information, or beam information used for channel or reference signal transmission between the network-side device and the terminal before the first DCI is transmitted), until the common beam information can be used;

or receiving the first feedback information transmitted by the terminal by using the common beam information.

It should be noted that "the common beam information can be used" may also be referred to as "the common beam information becomes effective", where an effective time of the common beam information includes any one of the following:

in a case that the first feedback information is an acknowledgement (ACK), after first preset duration from a transmission time of the first feedback information; and in a case that the first DCI is further used to schedule a physical uplink shared channel PUSCH, after second preset duration from a transmission time of second DCI.

In another optional embodiment, if the first DCI is further used to schedule a PDSCH, the method further includes:

if the network-side device does not receive the feedback information about the first DCI or receives negative acknowledgement feedback information about the first DCI, retransmitting the first DCI indicating the at least one piece of common beam information;

or if the network-side device does not receive the feedback information about the first DCI or receives negative acknowledgement feedback information about the first DCI, retransmitting the PDSCH until the number of times that no feedback information about the PDSCH is received or the number of times that negative acknowledgement feedback information about the PDSCH is received reaches the first preset number of times, and retransmitting the first DCI indicating the at least one piece of common beam information. It should be noted that this manner is generally used in a scenario in which the first feedback information and the feedback information about the PDSCH are jointly indicated in the first target feedback information, that is, the network cannot distinguish whether a received negative acknowledgement is for the first DCI or the PDSCH.

For example, if the first DCI is lost but the network still transmits the PDSCH by using the common beam information indicated by the first DCI, and the terminal does not feed back a HARQ-ACK because the terminal cannot receive the first DCI and the PDSCH, the network retransmits the first DCI indicating the at least one piece of common beam information.

In another example, if the first DCI is decoded incorrectly but the network still transmits the PDSCH by using the common beam information indicated by the first DCI, and the terminal feeds back a NACK or provides no feedback because the terminal cannot receive the PDSCH, the network retransmits the first DCI, or the network retransmits the first DCI after the number of times that the PDSCH is retransmitted reaches the specific number of times.

In another example, the first DCI is correctly received by the terminal, the network transmits the PDSCH by using the indicated common beam information, and the terminal receives the PDSCH; if the terminal feeds back an ACK or a NACK but the network does not receive the ACK or NACK, the network retransmits the first DCI, or retransmits the first DCI if no feedback is received or only NACKs are received before the number of times that the PDSCH is retransmitted reaches the specific number of times; if the terminal feeds back a NACK and the network receives the NACK, the network retransmits the PDSCH, or the network retransmits the first DCI, or the network retransmits the first DCI if no feedback is received or only NACKs are received before the number of times that the PDSCH is retransmitted reaches the preset number of times.

In still another optional embodiment, if the first DCI is further used to schedule the PUSCH, the method further includes:

if the PUSCH scheduled by the first DCI is not received, or the first feedback information is not received on the uplink resource in which the first feedback information is located, or the first feedback information being a negative acknowledgement is received, retransmitting the first DCI indicating the at least one piece of common beam information.

For example, if the first DCI is lost or the first DCI is decoded incorrectly, the terminal does not transmit the PUSCH, and the network retransmits the first DCI.

In another example, if the first DCI is decoded correctly, the terminal transmits the PUSCH; if the network does not receive the PUSCH correctly, the network retransmits the first DCI; if the network receives the PUSCH correctly, the subsequent DCI may be used to reschedule the PUSCH, and the terminal determines, based on the HARQ process number, the effective time of the common beam information indicated by the first DCI. Before the common beam information becomes effective, the terminal uses the original beam information (that is, the beam information used for channel or reference signal transmission between the network-side device and the terminal before the first DCI is transmitted).

In summary, in this embodiment of this application, the DCI or the MAC CE is used to indicate the common beam information of the channel and/or reference signal, to reduce signaling overheads of the beam indication. In addition, a feedback mechanism and an effective time scheme for the common beam information are provided. Therefore, robustness of the beam indication method and consistent understanding of beam effectiveness by the network and the terminal are ensured, and system performance is improved.

Figure 3:
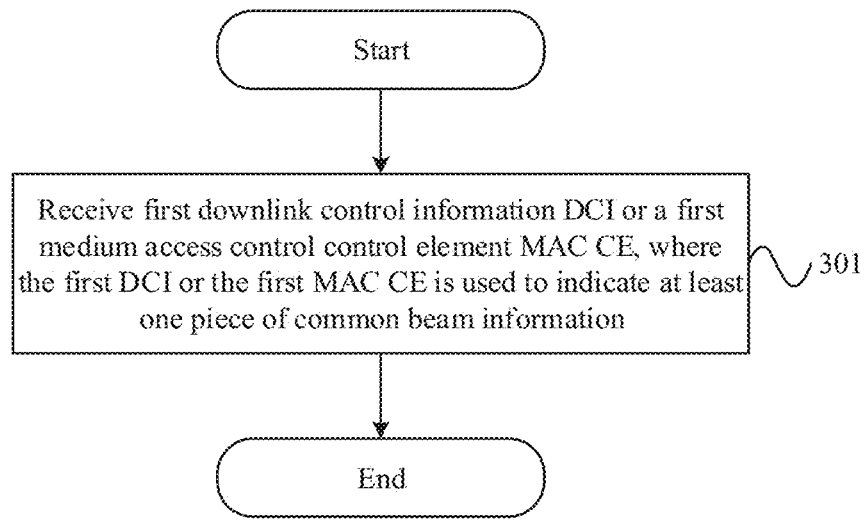
FIG. 3 is a second schematic diagram of steps of a beam indication method according to an embodiment of this application.

As shown in FIG. 3, an embodiment of this application further provides a beam indication method. The method is applied to a terminal and includes:

Step 301. Receive first downlink control information DCI or a first medium access control control element MAC CE, where the first DCI or the first MAC CE is used to indicate at least one piece of common beam information.

The common beam information corresponds to at least two channels, or the common beam information corresponds to at least two reference signals, or the common beam information corresponds to at least one channel and at least one reference signal.

For example, the channel includes at least one of: a physical downlink shared channel (PDSCH), a physical uplink shared channel (PUSCH), a physical uplink control channel (PUCCH), or a physical downlink control channel (PDCCH); and the reference signal includes at least one of: a channel state information reference signal (CSI-RS) or a sounding reference signal (SRS).

It should be noted that if the first DCI or the first MAC CE indicates one piece of common beam information, the common beam information is applicable to all channels and reference signals of a corresponding terminal; or if the first DCI or the first MAC CE indicates at least two pieces of common beam information, each piece of common beam information corresponds to one type of channel or reference signal, where channels or reference signals may be classified into different types based on their functions or transmission directions. For example, one type is a data channel, another type is a control channel, and another type is a reference signal. In another example, one type is an uplink channel and an uplink reference signal, and one type is a downlink channel and a downlink reference signal. This is not limited herein.

In an optional embodiment of this application, the first DCI may be in a DCI format dedicated to indicating common beam information; or the first DCI may reuse an existing DCI format, such as a DCI format1_1, a DCI format1_0, a DCI format0_1, or a DCI format0_0.

In an optional embodiment of this application, the common beam information indicated by the first DCI or the first MAC CE is applicable to any one of the following:

a first-type control resource set; and
a first-type control resource set and a channel or reference signal associated with the first-type control resource set.

The channel or reference signal associated with the first-type control resource set includes at least one of:

a channel or reference signal scheduled by DCI in the first-type control resource set, for example, a PDSCH, a PUSCH, or a CSI-RS; or
a feedback channel corresponding to a channel scheduled by DCI in the first-type control resource set, for example, a PUCCH or a PUSCH.

In an optional embodiment, a control resource set in which the first DCI is located belongs to the first-type control resource set. In other words, the common beam information indicated by the first DCI is applicable to the first-type control resource set to which the control resource set in which the first DCI is located belongs.

In at least one optional embodiment of this application, the receiving first downlink control information DCI in step 301 includes:

determining beam information of a second-type control resource set or target beam information based on an indication of a second MAC CE or a piece of DCI before the first DCI, where the target beam information is beam information of the second-type control resource set and a channel or reference signal associated with the second-type control resource set; and
receiving a downlink control channel in the second-type control resource set, where the downlink control channel includes the first DCI.

In other words, the first DCI is carried on a PDCCH in the second-type control resource set, and the beam information (such as TCI state information) of the second-type control resource set is indicated by the second MAC CE, or indicated by the previous DCI of the first DCI.

Optionally, at least one embodiment of this application further provides a feedback mechanism for the common beam information, that is, after step 301, the method further includes:

transmitting first feedback information to a network-side device, where the first feedback information is used to indicate whether the terminal has correctly received the first DCI or the first MAC CE. For example, the first feedback information is hybrid automatic repeat request acknowledgement (HARQ-ACK) information. Optionally, the first feedback information is used to indicate whether the terminal has correctly received the common beam information. Optionally, the first feedback information may be carried on a PUCCH or a PUSCH.

In an optional embodiment, the method further includes:

determining an uplink resource for the first feedback information in a first manner, where the first manner includes at least one of:

determining the uplink resource for the first feedback information based on an uplink resource that is for the first feedback information and indicated in the first DCI or the first MAC CE, that is, the uplink resource for the first feedback information is directly carried in the first DCI or the first MAC CE;

determining, based on a downlink resource in which the first DCI or the first MAC CE is located and an association relationship between uplink and downlink resources, that an uplink resource associated with the downlink resource in which the first DCI or the first MAC CE is located is the uplink resource for the first feedback information, that is, a preset association relationship exists between the downlink resource in which the first DCI or the first MAC CE is located and the corresponding uplink resource for the first feedback information; or determining, based on a transmission time of the first DCI or the first MAC CE and a preset timing relationship, that an uplink resource satisfying the preset timing relationship with the transmission time of the first DCI or the first MAC CE is the uplink resource for the first feedback information, that is, the preset timing relationship exists between the transmission time of the first DCI or the first MAC CE and the uplink resource for the first feedback information, for example, a first available uplink resource after preset duration counting from the transmission time of the first DCI or the first MAC CE is the uplink resource for the first feedback information.

It should be noted that the first DCI mentioned in this embodiment of this application may be DCI dedicated to indicating common beam information, or existing DCI may be reused, for example, DCI for scheduling a PDSCH or DCI for scheduling a PUSCH.

In an optional embodiment, in a case that the first DCI is further used to schedule a physical downlink shared channel PDSCH, the method further includes:

transmitting feedback information about the PDSCH, where the first feedback information and the feedback information about the PDSCH are jointly indicated (for example, the feedback information about the PDSCH is reused); or the first feedback information and the feedback information about the PDSCH are separately indicated (for example, the first feedback information is only used to indicate whether the terminal has correctly received the common beam information, and the feedback information about the PDSCH is only used to indicate whether the terminal has correctly received the PDSCH).

In another optional embodiment, in a case that the first DCI is further used to schedule a physical uplink shared channel PUSCH, there is no feedback information about the PUSCH, and the first feedback information is feedback information for the first DCI; and correspondingly, in this case, an uplink resource in which the first feedback information is located includes at least one of:

the PUSCH scheduled by the first DCI;

a PUSCH scheduled by second DCI, where the PUSCH scheduled by the second DCI and the PUSCH scheduled by the first DCI use a same HARQ process number;

a first available uplink resource after the PUSCH scheduled by the first DCI; or a first available uplink resource after the first DCI.

In this case, the network-side device may check whether a HARQ process number used by the PUSCH scheduled by the second DCI is the same as a HARQ process number used by the PUSCH scheduled by the first DCI, to determine whether the terminal has correctly received the first DCI. For example, if the PUSCH scheduled by the second DCI and the PUSCH scheduled by the first DCI use the same HARQ process number, the network-side device determines that the terminal has correctly received the first DCI; otherwise, the network-side device considers that the terminal has not correctly received the first DCI.

Referring to the foregoing example, in an optional embodiment, the method further includes at least one of the following.

In a case that the first feedback information is an acknowledgement (ACK), after first preset duration from a transmission time of the first feedback information, the common beam information is used for a channel or reference signal corresponding to the common beam information (which may also be referred to as "the common beam information becomes effective"). For example, the common beam information becomes effective after the first preset duration counting from the transmission time of the first feedback information being an ACK.

In a case that the first DCI is further used to schedule a physical uplink shared channel PUSCH, after second preset duration from a transmission time of second DCI, the common beam information is used for a channel or reference signal corresponding to the common beam information (which may also be referred to as "the common beam information becomes effective"), where the PUSCH scheduled by the second DCI and the PUSCH scheduled by the first DCI have a same hybrid automatic repeat request HARQ process number. For example, the common beam information becomes effective after the second preset duration counting from the transmission time of the second DCI used by the PUSCH that is newly scheduled by the network and that has the same HARQ process number as the PUSCH scheduled by the first DCI.

In at least one optional embodiment of this application, there may be a case that a transmission time of a channel or reference signal scheduled by a piece of DCI precedes a time at which the common beam information becomes effective. That is, if a transmission time of a channel or reference signal scheduled by third DCI precedes a time at which the common beam information can be used, the method further includes:

transmitting, by using first default beam information, the channel or reference signal scheduled by the third DCI, where the first default beam information includes:

beam information corresponding to the transmission time of the channel or reference signal scheduled by the third DCI; or beam information of a control resource set with a smallest ID.

The control resource set with the smallest ID may be: a control resource set with a lowest ID in all control resource sets in a current cell; a control resource set with a lowest ID in the first-type control resource set and the second-type control resource set; or a control resource set with a lowest ID in a type of control resource set to which a control resource set of the third DCI for scheduling the channel or reference signal belongs.

In another optional embodiment of this application, there may be a case that a transmission time of a piece of DCI precedes a time at which the common beam information becomes effective, but a transmission time of a channel or reference signal scheduled by the DCI follows the time at which the common beam information becomes effective. That is, if a transmission time of fourth DCI precedes a time at which the common beam information can be used, and a transmission time of a channel or reference signal scheduled by the fourth DCI follows the time at which the common beam information can be used, the method further includes:

transmitting, by using second default beam information, the channel or reference signal scheduled by the fourth DCI, where the second default beam information includes:

beam information corresponding to the transmission time of the fourth DCI;

beam information of a control resource set with a smallest ID; and the common beam information indicated by the first DCI or the first MAC CE.

It should be noted that "preceding a time at which the common beam information can be used" may also be referred to as "before the common beam information becomes effective", where an effective time of the common beam information includes any one of the following:

in a case that the first feedback information is an acknowledgement (ACK), after first preset duration from a transmission time of the first feedback information; and in a case that the first DCI is further used to schedule a physical uplink shared channel PUSCH, after second preset duration from a transmission time of second DCI.

The control resource set with the smallest ID may be: a control resource set with a lowest ID in all control resource sets in a current cell; a control resource set with a lowest ID in the first-type control resource set and the second-type control resource set; or a control resource set with a lowest ID in a type of control resource set to which a control resource set of the fourth DCI for scheduling the channel or reference signal belongs.

To ensure a robustness mechanism for the common beam information indicated by the first DCI or the first MAC CE, in at least one embodiment of this application, the method further includes:

in a case that the first feedback information is an acknowledgement, transmitting a corresponding channel or reference signal by using the common beam information, or receiving again the first DCI or the first MAC CE indicating the at least one piece of common beam information, where for example, if the first feedback information is an ACK and the network-side device receives the ACK, the common beam information becomes effective; or if the first feedback information is an ACK but the network-side device does not receive the ACK, the first DCI or the first MAC CE is received again;

or in a case that the first feedback information is a negative acknowledgement, receiving again the first DCI or the first MAC CE indicating the at least one piece of common beam information.

That the network-side device does not receive feedback information about the first DCI or the first MAC CE includes two cases: The terminal transmits the corresponding feedback information but the network-side device does not receive the feedback information; and the terminal does not transmit the corresponding feedback information.

For example, in a case that the first DCI is only used to indicate the common beam information, a transmission time sequence between the network-side device and the terminal is:

first DCI→HARQ-ACK→PDSCH/PUSCH; or first DCI→HARQ-ACK→second DCI→PDSCH/PUSCH.

In another example, in a case that the first DCI is used to indicate the common beam information and also used to schedule a PDSCH, a transmission time sequence between the network-side device and the terminal is:

first DCI→PDSCH→HARQ-ACK, where the network-side device transmits the PDSCH by using the common beam information indicated in the first DCI.

In another example, in a case that the first DCI is used to indicate the common beam information and also used to schedule a PUSCH, a transmission time sequence between the network-side device and the terminal is:

first DCI→first PUSCH→second DCI→second PUSCH newly scheduled and having a same HARQ process number as the first PUSCH.

Optionally, in at least one embodiment of this application, in a case that the first feedback information and the feedback information about the PDSCH are jointly indicated in the first target feedback information, if the first target feedback information is an acknowledgement, both the first feedback information and the feedback information about the PDSCH are acknowledgements;

or if the first target feedback information is a negative acknowledgement, at least one of the first feedback information or the feedback information about the PDSCH is a negative acknowledgement.

In this embodiment of this application, it is not distinguished which part of the first target feedback information is the first feedback information and which part of the first target feedback information is the feedback information about the PDSCH. The first target feedback information is one piece of feedback information. For example, the first target feedback information is one bit. When the bit is set to 1, the first target feedback information is an ACK. In this case, both the first feedback information and the feedback information about the PDSCH are ACKs. When the bit is set to 0, the first target feedback information is a NACK. In this case, at least one of the first feedback information or the feedback information about the PDSCH is a NACK, but the network cannot distinguish which piece of feedback information is a NACK.

Optionally, in at least one embodiment of this application, in a case that the first feedback information and the feedback information about the PDSCH are separately indicated in the second target feedback information, the second target feedback information further includes first indication information, where the first indication information is used to indicate that the second target feedback information includes the first feedback information or the feedback information about the PDSCH; for example, HARQ-ACK information explicitly indicates that the information is the first feedback information or the feedback information about the PDSCH; optionally, the indication information is carried only when a NACK is fed back; in another example, the second target feedback information includes information related to an M1-bit feedback, where one bit (that is, second indication information) is added before the information related to the M1-bit feedback, and the bit is set to 1 to indicate that subsequent M1 bits are the first feedback information, or the bit is set to 0 to indicate that subsequent M1 bits are the feedback information about the PDSCH;

or the second target feedback information further includes second indication information, where the second indication information is used to indicate an arrangement order or position information of the first feedback information in the second target feedback information and the feedback information about the PDSCH in the second target feedback information; for example, the second target feedback information includes information related to an M2-bit feedback, one bit (that is, second indication information) is added before the information related to the M2-bit feedback, and the bit is set to 1 to indicate that first N1 bits in subsequent M2 bits are the first feedback information and that last N2 bits are the feedback information about the PDSCH, or the bit is set to 0 to indicate that first N1 bits in subsequent M2 bits are the feedback information about the PDSCH and that last N2 bits are the first feedback information;

or at least one of an uplink resource, timing information, a scrambling mode, a time/frequency domain offset, or a code division mode respectively used by the first feedback information and the feedback information about the PDSCH indicates that the second target feedback information includes the first feedback information or the feedback information about the PDSCH; feedback information on an uplink resource 1 is the first feedback information, and feedback information on an uplink resource 2 is the feedback information about the PDSCH;

or in the second target feedback information, the first feedback information and the feedback information about the PDSCH are separately encoded and arranged according to a preset rule; in this case, the network-side device may determine, based on an arrangement order, that the corresponding feedback information is the first feedback information or the feedback information about the PDSCH; for example, the first feedback information occupies first M3 bits, and the feedback information about the PDSCH occupies last M4 bits;

or in the second target feedback information, the first feedback information and the feedback information about the PDSCH are jointly encoded, where a decoding result of the joint encoding can indicate the first feedback information and the feedback information about the PDSCH that are included in the second target feedback information; for example, the second target feedback information is M5 bits; assuming that M5 is equal to 2, as indicated by a preset encoding rule, a decoding result "01" indicates that the first feedback information and the feedback information about the PDSCH are both ACKs, and a decoding result "10" indicates that the first feedback information is an ACK and that the feedback information about the PDSCH is a NACK; details are not exhaustively illustrated herein.

In an optional embodiment, the transmitting first feedback information to a network-side device includes:

transmitting the first feedback information by using current beam information (which may also be referred to as original beam information, or beam information used for channel or reference signal transmission between the network-side device and the terminal before the first DCI is transmitted), until the common beam information can be used; or transmitting the first feedback information by using the common beam information.

It should be noted that "the common beam information can be used" may also be referred to as "the common beam information becomes effective", where an effective time of the common beam information includes any one of the following:

in a case that the first feedback information is an acknowledgement (ACK), after first preset duration from a transmission time of the first feedback information; and in a case that the first DCI is further used to schedule a physical uplink shared channel PUSCH, after second preset duration from a transmission time of second DCI.

In another optional embodiment, if the first DCI is further used to schedule a PDSCH, and if the terminal does not transmit feedback information, or the terminal transmits negative acknowledgement feedback information, or the terminal transmits feedback information (ACK or NACK) but a network-side device does not receive the feedback information, the method further includes:

receiving again the first DCI indicating the at least one piece of common beam information;

or receiving again the PDSCH until the number of times that no feedback information about the PDSCH is transmitted or the number of times that negative acknowledgement feedback information about the PDSCH is transmitted reaches the first preset number of times, and receiving again the first DCI indicating the at least one piece of common beam information. In other words, the PDSCH is received again until the number of times that no feedback information about the PDSCH is transmitted or the number of times that negative acknowledgement feedback information about the PDSCH is transmitted reaches the first preset number of times, and the first DCI indicating the at least one piece of common beam information is received again. It should be noted that this manner is generally used in a scenario in which the first feedback information and the feedback information about the PDSCH are jointly indicated in the first target feedback information, that is, the network cannot distinguish whether a received negative acknowledgement is for the first DCI or the PDSCH. Therefore, in this case, the feedback information transmitted by the terminal is the first target feedback information.

For example, if the first DCI is lost but the network still transmits the PDSCH by using the common beam information indicated by the first DCI, and the terminal does not feed back a HARQ-ACK because the terminal cannot receive the first DCI and the PDSCH, the terminal receives the first DCI indicating the at least one piece of common beam information and retransmitted by the network.

In another example, if the first DCI is decoded incorrectly but the network still transmits the PDSCH by using the common beam information indicated by the first DCI, and the terminal feeds back a NACK or provides no feedback because the terminal cannot receive the PDSCH, the terminal receives the first DCI retransmitted by the network, or the terminal receives the first DCI retransmitted by the network after the number of times that the PDSCH is retransmitted reaches the specific number of times.

In another example, the first DCI is correctly received by the terminal, the network transmits the PDSCH by using the indicated common beam information, and the terminal receives the PDSCH; if the terminal feeds back an ACK or a NACK but the network does not receive the ACK or NACK, the terminal receives the first DCI retransmitted by the network, or the terminal receives the first DCI retransmitted by the network if no feedback is received or only NACKs are received before the number of times that the PDSCH is retransmitted reaches the specific number of times; if the terminal feeds back a NACK and the network receives the NACK, the terminal receives the PDSCH retransmitted by the network, or the terminal receives the first DCI retransmitted by the network, or the terminal receives the first DCI retransmitted by the network if no feedback is received or only NACKs are received before the number of times that the PDSCH is retransmitted reaches the preset number of times.

In still another optional embodiment, if the first DCI is further used to schedule the PUSCH, the method further includes:

if the terminal does not correctly receive the first DCI, or the terminal does not transmit the first feedback information on the uplink resource in which the first feedback information is located, or the terminal transmits the first feedback information being a negative acknowledgement, receiving again the first DCI indicating the at least one piece of common beam information.

For example, if the first DCI is lost or the first DCI is decoded incorrectly, the terminal does not transmit the PUSCH, and the terminal receives the first DCI retransmitted by the network.

In another example, if the first DCI is decoded correctly, the terminal transmits the PUSCH; if the network does not receive the PUSCH correctly, the terminal receives the first DCI retransmitted by the network; if the network receives the PUSCH correctly, the subsequent DCI may be used to reschedule the PUSCH, and the terminal determines, based on the HARQ process number, the effective time of the common beam information indicated by the first DCI. Before the common beam information becomes effective, the terminal uses the original beam information (that is, the beam information used for channel or reference signal transmission between the network-side device and the terminal before the first DCI is transmitted).

In summary, in this embodiment of this application, the DCI or the MAC CE is used to indicate the common beam information of the channel and/or reference signal, to reduce signaling overheads of the beam indication. In addition, a feedback mechanism and an effective time scheme for the common beam information are provided. Therefore, robustness of the beam indication method and consistent understanding of beam effectiveness by the network and the terminal are ensured, and system performance is improved.

It should be noted that the beam indication method provided in this embodiment of this application may be performed by a beam indication apparatus or a control module for performing the beam indication method in the beam indication apparatus. A beam indication apparatus provided in an embodiment of this application is described by assuming that the beam indication method in this embodiment of this application is performed by the beam indication apparatus.

Figure 4:
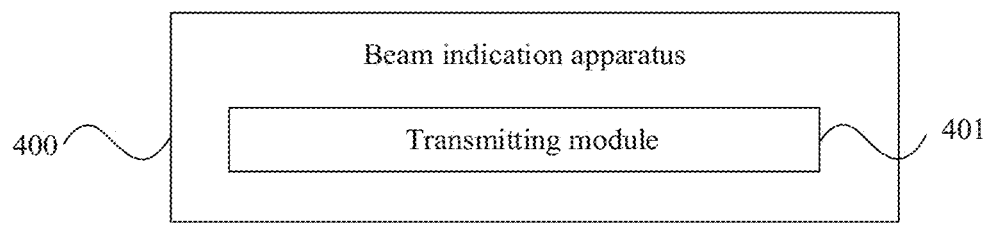
FIG. 4 is a first schematic structural diagram of a beam indication apparatus according to an embodiment of this application.

As shown in FIG. 4, an embodiment of this application further provides a beam indication apparatus 400. The apparatus is applied to a network-side device and includes:

a transmitting module 401, configured to transmit first downlink control information DCI or a first medium access control control element MAC CE, where the first DCI or the first MAC CE is used to indicate at least one piece of common beam information, where the common beam information corresponds to at least two channels, or the common beam information corresponds to at least two reference signals, or the common beam information corresponds to at least one channel and at least one reference signal.

In an optional embodiment of this application, the common beam information indicated by the first DCI or the first MAC CE is applicable to any one of the following:

a first-type control resource set; and a first-type control resource set and a channel or reference signal associated with the first-type control resource set.

In an optional embodiment of this application, the channel or reference signal associated with the first-type control resource set includes at least one of:

a channel or reference signal scheduled by DCI in the first-type control resource set; or a feedback channel corresponding to a channel scheduled by DCI in the first-type control resource set.

In an optional embodiment of this application, a control resource set in which the first DCI is located belongs to the first-type control resource set.

In an optional embodiment of this application, the transmitting module includes:

a first transmitting submodule, configured to transmit a downlink control channel in a second-type control resource set, where the downlink control channel includes the first DCI, where beam information of the second-type control resource set is indicated by using a second MAC CE or a piece of DCI before the first DCI, or target beam information is indicated by using a second MAC CE or a piece of DCI before the first DCI, where the target beam information is beam information of the second-type control resource set and a channel or reference signal associated with the second-type control resource set.

In an optional embodiment of this application, the apparatus further includes:

an information determining module, configured to determine the common beam information from a plurality of pieces of beam information configured by radio resource control RRC signaling; or determine the common beam information from a plurality of pieces of beam information activated by a third MAC CE.

In an optional embodiment of this application, the transmitting module includes:

a second transmitting submodule, configured to transmit the first DCI in a case that a quantity of the at least one piece of common beam information satisfies a first condition; otherwise, transmit the first MAC CE.

In an optional embodiment of this application, the apparatus further includes:

a first feedback receiving module, configured to receive first feedback information transmitted by a terminal, where the first feedback information is used to indicate whether the terminal has correctly received the first DCI or the first MAC CE.

In an optional embodiment of this application, the apparatus further includes:
a first resource determining module, configured to determine an uplink resource for the first feedback information in a first manner, where the first manner includes at least one of:
determining the uplink resource for the first feedback information based on an uplink resource that is for the first feedback information and indicated in the first DCI or the first MAC CE;
determining, based on a downlink resource in which the first DCI or the first MAC CE is located and an association relationship between uplink and downlink resources, that an uplink resource associated with the downlink resource in which the first DCI or the first MAC CE is located is the uplink resource for the first feedback information; or
determining, based on a transmission time of the first DCI or the first MAC CE and a preset timing relationship, that an uplink resource satisfying the preset timing relationship with the transmission time of the first DCI or the first MAC CE is the uplink resource for the first feedback information.

In an optional embodiment of this application, in a case that the first DCI is further used to schedule a physical downlink shared channel PDSCH, the apparatus further includes:
a second feedback receiving module, configured to receive feedback information about the PDSCH, where the first feedback information and the feedback information about the PDSCH are jointly indicated in first target feedback information; or the first feedback information and the feedback information about the PDSCH are separately indicated in second target feedback information.

In an optional embodiment of this application, in a case that the first DCI is further used to schedule a physical uplink shared channel PUSCH,
an uplink resource in which the first feedback information is located includes at least one of:
the PUSCH scheduled by the first DCI;
a PUSCH scheduled by second DCI, where the PUSCH scheduled by the second DCI and the PUSCH scheduled by the first DCI use a same HARQ process number;
a first available uplink resource after the PUSCH scheduled by the first DCI; or
a first available uplink resource after the first DCI.

In an optional embodiment of this application, the apparatus further includes at least one of:
a first processing module, configured to use the common beam information for a channel or reference signal corresponding to the common beam information after first preset duration from a transmission time of the first feedback information in a case that the first feedback information is an acknowledgement; or
a second processing module, configured to use the common beam information for a channel or reference signal corresponding to the common beam information after second preset duration from a transmission time of second DCI in a case that the first DCI is further used to schedule a physical uplink shared channel PUSCH, where the PUSCH scheduled by the second DCI and the PUSCH scheduled by the first DCI have a same hybrid automatic repeat request HARQ process number.

In an optional embodiment of this application, if a transmission time of a channel or reference signal scheduled by third DCI precedes a time at which the common beam information can be used, the apparatus further includes:
a first transmission module, configured to transmit, by using first default beam information, the channel or reference signal scheduled by the third DCI, where the first default beam information includes:
beam information corresponding to the transmission time of the channel or reference signal scheduled by the third DCI; or
beam information of a control resource set with a smallest ID.

In an optional embodiment of this application, if a transmission time of fourth DCI precedes a time at which the common beam information can be used, and a transmission time of a channel or reference signal scheduled by the fourth DCI follows the time at which the common beam information can be used, the apparatus further includes:
a second transmission module, configured to transmit, by using second default beam information, the channel or reference signal scheduled by the fourth DCI, where the second default beam information includes:
beam information corresponding to the transmission time of the fourth DCI;
beam information of a control resource set with a smallest ID; and
the common beam information indicated by the first DCI or the first MAC CE.

In an optional embodiment of this application, the apparatus further includes:
a third transmission module, configured to: in a case that the first feedback information is an acknowledgement, transmit a corresponding channel or reference signal by using the common beam information; or
in a case that the first feedback information is a negative acknowledgement, retransmit the first DCI or the first MAC CE indicating the at least one piece of common beam information.

In an optional embodiment of this application, the apparatus further includes:
a fourth transmission module, configured to: if the network-side device does not receive feedback information about the first DCI or the first MAC CE, retransmit the first DCI or the first MAC CE indicating the at least one piece of common beam information.

In an optional embodiment of this application, in a case that the first feedback information and the feedback information about the PDSCH are jointly indicated in the first target feedback information,
if the first target feedback information is an acknowledgement, both the first feedback information and the feedback information about the PDSCH are acknowledgements;
or
if the first target feedback information is a negative acknowledgement, at least one of the first feedback information or the feedback information about the PDSCH is a negative acknowledgement.

In an optional embodiment of this application, in a case that the first feedback information and the feedback information about the PDSCH are separately indicated in the second target feedback information, the second target feedback information further includes
first indication information, where the first indication
information is used to indicate that the second target
feedback information includes the first feedback information or the feedback information about the PDSCH;
or
the second target feedback information further includes
second indication information, where the second indication information is used to indicate an arrangement
order or position information of the first feedback
information in the second target feedback information
and the feedback information about the PDSCH in the
second target feedback information;
or
at least one of an uplink resource, timing information, a
scrambling mode, a time/frequency domain offset, or a
code division mode respectively used by the first feedback information and the feedback information about
the PDSCH indicates that the second target feedback
information includes the first feedback information or
the feedback information about the PDSCH;
or
in the second target feedback information, the first feedback information and the feedback information about
the PDSCH are separately encoded and arranged
according to a preset rule;
or
in the second target feedback information, the first feedback information and the feedback information about
the PDSCH are jointly encoded, where a decoding
result of the joint encoding can indicate the first feedback information and the feedback information about
the PDSCH that are included in the second target
feedback information.

In an optional embodiment of this application, the first feedback receiving module includes:

a first feedback receiving submodule, configured to:
receive the first feedback information transmitted by
the terminal by using current beam information, until
the common beam information can be used; or
receive the first feedback information transmitted by the
terminal by using the common beam information.

In an optional embodiment of this application, if the first DCI is further used to schedule a PDSCH, the apparatus further includes:

a fifth transmission module, configured to retransmit the
first DCI indicating the at least one piece of common
beam information; or
retransmit the PDSCH until the number of times that no
feedback information about the PDSCH is received or
the number of times that negative acknowledgement
feedback information about the PDSCH is received
reaches the first preset number of times, and retransmit
the first DCI indicating the at least one piece of
common beam information.

In an optional embodiment of this application, if the first DCI is further used to schedule the PUSCH, the apparatus further includes:

a sixth transmission module, configured to: if the PUSCH
scheduled by the first DCI is not received, or the first
feedback information is not received on the uplink
resource in which the first feedback information is
located, or the first feedback information being a negative acknowledgement is received, retransmit the first
DCI indicating the at least one piece of common beam
information.

In this embodiment of this application, the DCI or the MAC CE is used to indicate the common beam information of the channel and/or reference signal, to reduce signaling overheads of the beam indication. In addition, a feedback mechanism and an effective time scheme for the common beam information are provided. Therefore, robustness of the beam indication method and consistent understanding of beam effectiveness by the network and the terminal are ensured, and system performance is improved.

It should be noted that the beam indication apparatus provided in this embodiment of this application is an apparatus capable of performing the foregoing beam indication method, and all embodiments of the foregoing beam indication method are applicable to the apparatus, with the same or similar beneficial effects achieved.

Figure 5:
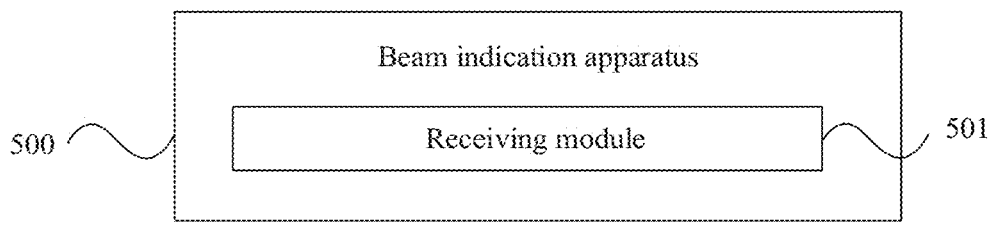
FIG. 5 is a second schematic structural diagram of a beam indication apparatus according to an embodiment of this application.

As shown in FIG. 5, an embodiment of this application further provides a beam indication apparatus 500. The apparatus is applied to a terminal and includes:

a receiving module 501, configured to receive first downlink control information DCI or a first medium access control control element MAC CE, where the first DCI or the first MAC CE is used to indicate at least one piece of common beam information, where
the common beam information corresponds to at least two channels, or the common beam information corresponds to at least two reference signals, or the common beam information corresponds to at least one channel and at least one reference signal.

In an optional embodiment of this application, the common beam information indicated by the first DCI or the first MAC CE is applicable to any one of the following:

a first-type control resource set; and
a first-type control resource set and a channel or reference signal associated with the first-type control resource set.

In an optional embodiment of this application, the channel or reference signal associated with the first-type control resource set includes at least one of:

a channel or reference signal scheduled by DCI in the first-type control resource set; or
a feedback channel corresponding to a channel scheduled by DCI in the first-type control resource set.

In an optional embodiment of this application, a control resource set in which the first DCI is located belongs to the first-type control resource set.

In an optional embodiment of this application, the receiving module includes:

a first receiving submodule, configured to: determine
beam information of a second-type control resource set
or target beam information based on an indication of a
second MAC CE or a piece of DCI before the first DCI,
where the target beam information is beam information
of the second-type control resource set and a channel or
reference signal associated with the second-type control resource set; and
receive a downlink control channel in the second-type
control resource set, where the downlink control channel includes the first DCI.

In an optional embodiment of this application, the apparatus further includes:

a first feedback transmitting module, configured to transmit first feedback information to a network-side device,
where the first feedback information is used to indicate
whether the terminal has correctly received the first
DCI or the first MAC CE.

In an optional embodiment of this application, the apparatus further includes:

a second resource determining module, configured to determine an uplink resource for the first feedback information in a first manner, where the first manner includes at least one of:
determining the uplink resource for the first feedback information based on an uplink resource that is for the first feedback information and indicated in the first DCI or the first MAC CE;
determining, based on a downlink resource in which the first DCI or the first MAC CE is located and an association relationship between uplink and downlink resources, that an uplink resource associated with the downlink resource in which the first DCI or the first MAC CE is located is the uplink resource for the first feedback information; or
determining, based on a transmission time of the first DCI or the first MAC CE and a preset timing relationship, that an uplink resource satisfying the preset timing relationship with the transmission time of the first DCI or the first MAC CE is the uplink resource for the first feedback information.

In an optional embodiment of this application, in a case that the first DCI is further used to schedule a physical downlink shared channel PDSCH, the apparatus further includes:
a second feedback transmitting module, configured to transmit feedback information about the PDSCH, where
the first feedback information and the feedback information about the PDSCH are jointly indicated in first target feedback information; or the first feedback information and the feedback information about the PDSCH are separately indicated in second target feedback information.

In an optional embodiment of this application, in a case that the first DCI is further used to schedule a physical uplink shared channel PUSCH,
an uplink resource in which the first feedback information is located includes at least one of:
the PUSCH scheduled by the first DCI;
a PUSCH scheduled by second DCI, where the PUSCH scheduled by the second DCI and the PUSCH scheduled by the first DCI use a same HARQ process number;
a first available uplink resource after the PUSCH scheduled by the first DCI; or
a first available uplink resource after the first DCI.

In an optional embodiment of this application, the apparatus further includes at least one of:
a third processing module, configured to use the common beam information for a channel or reference signal corresponding to the common beam information after first preset duration from a transmission time of the first feedback information in a case that the first feedback information is an acknowledgement; or
a fourth processing module, configured to use the common beam information for a channel or reference signal corresponding to the common beam information after second preset duration from a transmission time of second DCI in a case that the first DCI is further used to schedule a physical uplink shared channel PUSCH, where the PUSCH scheduled by the second DCI and the PUSCH scheduled by the first DCI have a same hybrid automatic repeat request HARQ process number.

In an optional embodiment of this application, if a transmission time of a channel or reference signal scheduled by third DCI precedes a time at which the common beam information can be used, the apparatus further includes:
a tenth transmission module, configured to transmit, by using first default beam information, the channel or reference signal scheduled by the third DCI, where the first default beam information includes:
beam information corresponding to the transmission time of the channel or reference signal scheduled by the third DCI; or
beam information of a control resource set with a smallest ID.

In an optional embodiment of this application, if a transmission time of fourth DCI precedes a time at which the common beam information can be used, and a transmission time of a channel or reference signal scheduled by the fourth DCI follows the time at which the common beam information can be used, the apparatus further includes:
an eleventh transmission module, configured to transmit, by using second default beam information, the channel or reference signal scheduled by the fourth DCI, where the second default beam information includes:
beam information corresponding to the transmission time of the fourth DCI;
beam information of a control resource set with a smallest ID; and
the common beam information indicated by the first DCI or the first MAC CE.

In an optional embodiment of this application, the apparatus further includes:
a twelfth transmission module, configured to: in a case that the first feedback information is an acknowledgement, transmit a corresponding channel or reference signal by using the common beam information, or receive again the first DCI or the first MAC CE indicating the at least one piece of common beam information; or
in a case that the first feedback information is a negative acknowledgement, receive again the first DCI or the first MAC CE indicating the at least one piece of common beam information.

In an optional embodiment of this application, in a case that the first feedback information and the feedback information about the PDSCH are jointly indicated in the first target feedback information,
if the first feedback information and the feedback information about the PDSCH are both acknowledgements, the first target feedback information is an acknowledgement;
or
if at least one of the first feedback information or the feedback information about the PDSCH is a negative acknowledgement, the first target feedback information is a negative acknowledgement.

In an optional embodiment of this application, in a case that the first feedback information and the feedback information about the PDSCH are separately indicated in the second target feedback information,
the second target feedback information further includes first indication information, where the first indication information is used to indicate that the second target feedback information includes the first feedback information or the feedback information about the PDSCH; or
the second target feedback information further includes second indication information, where the second indication information is used to indicate an arrangement order or position information of the first feedback information in the second target feedback information and the feedback information about the PDSCH in the second target feedback information;

or at least one of an uplink resource, timing information, a scrambling mode, a time/frequency domain offset, or a code division mode respectively used by the first feedback information and the feedback information about the PDSCH indicates that the second target feedback information includes the first feedback information or the feedback information about the PDSCH;

or in the second target feedback information, the first feedback information and the feedback information about the PDSCH are separately encoded and arranged according to a preset rule;

or in the second target feedback information, the first feedback information and the feedback information about the PDSCH are jointly encoded, where a decoding result of the joint encoding can indicate the first feedback information and the feedback information about the PDSCH that are included in the second target feedback information.

In an optional embodiment of this application, the first feedback transmitting module includes:

a first feedback transmitting submodule, configured to:
transmit the first feedback information by using current beam information, until the common beam information can be used; or
transmit the first feedback information by using the common beam information.

In an optional embodiment of this application, if the first DCI is further used to schedule a PDSCH, the apparatus further includes:

a fourteenth transmission module, configured to: receive again the first DCI indicating the at least one piece of common beam information; or
receive again the PDSCH until the number of times that no feedback information about the PDSCH is transmitted or the number of times that negative acknowledgement feedback information about the PDSCH is transmitted reaches the first preset number of times, and receive again the first DCI indicating the at least one piece of common beam information.

In an optional embodiment of this application, if the first DCI is further used to schedule the PUSCH, the apparatus further includes:

a fifteenth transmission module, configured to: if the terminal does not correctly receive the first DCI, or the terminal does not transmit the first feedback information on the uplink resource in which the first feedback information is located, or the terminal transmits the first feedback information being a negative acknowledgement, receive again the first DCI indicating the at least one piece of common beam information.

In this embodiment of this application, the DCI or the MAC CE is used to indicate the common beam information of the channel and/or reference signal, to reduce signaling overheads of the beam indication. In addition, a feedback mechanism and an effective time scheme for the common beam information are provided. Therefore, robustness of the beam indication method and consistent understanding of beam effectiveness by the network and the terminal are ensured, and system performance is improved.

It should be noted that the beam indication apparatus provided in this embodiment of this application is an apparatus capable of performing the foregoing beam indication method, and all embodiments of the foregoing beam indication method are applicable to the apparatus, with the same or similar beneficial effects achieved.

The beam indication apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not limited in this embodiment of this application.

The beam indication apparatus in this embodiment of this application may be an apparatus having an operating system. The operating system may be an Android operating system, an iOS operating system, or another possible operating system, and is not limited in this embodiment of this application.

The beam indication apparatus provided in this embodiment of this application is capable of implementing each process implemented in the method embodiment in FIG. 2 or FIG. 3. To avoid repetition, details are not described herein again.

Figure 6:
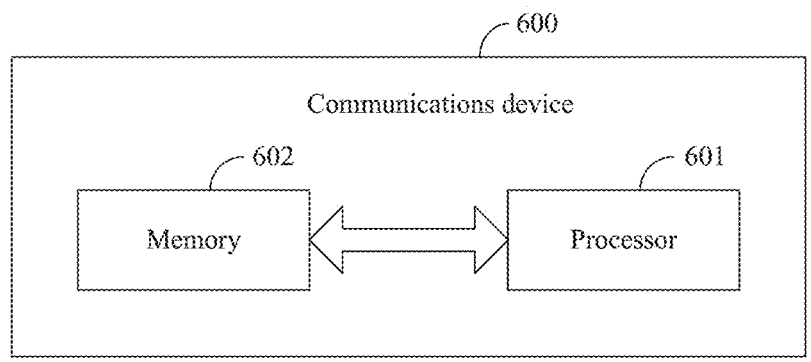
FIG. 6 is a schematic structural diagram of a communications device according to an embodiment of this application.

Optionally, as shown in FIG. 6, an embodiment of this application further provides a communications device 600, including a processor 601, a memory 602, and a program or instructions stored in the memory 602 and executable on the processor 601. For example, when the communications device 600 is a terminal, and the program or instructions are executed by the processor 601, each process of the foregoing beam indication method embodiment is implemented, with the same technical effect achieved. When the communications device 600 is a network-side device, and the program or instructions are executed by the processor 601, each process of the foregoing beam indication method embodiment is implemented, with the same technical effect achieved. To avoid repetition, details are not described herein again.

Figure 7:
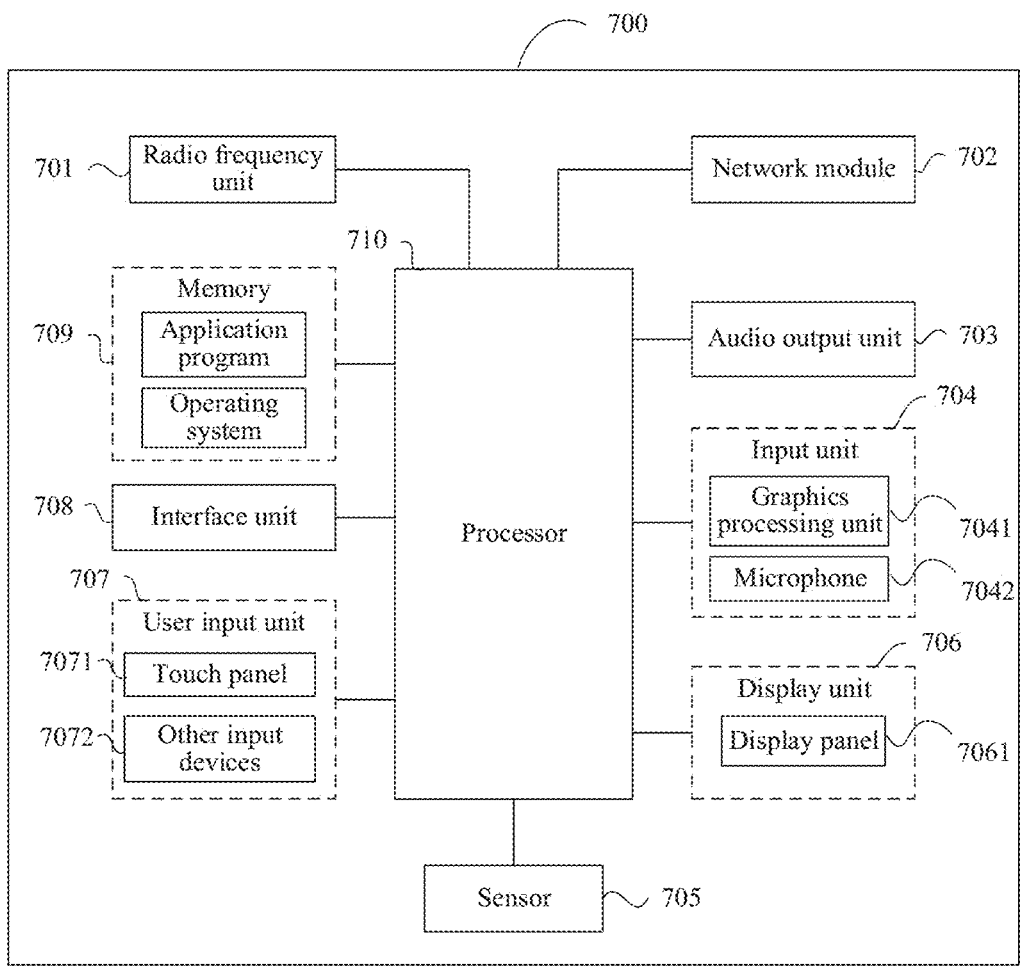
FIG. 7 is a schematic structural diagram of a terminal according to an embodiment of this application.

FIG. 7 is a schematic diagram of a hardware structure of a terminal for implementing an embodiment of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

Persons skilled in the art may understand that the terminal 700 may further include a power supply (for example, a battery) supplying power to all components. Optionally, the power supply may be logically connected to the processor 710 through a power management system. In this way, functions such as charge management, discharge management, and power consumption management are implemented by using the power management system. The terminal structure shown in FIG. 7 does not constitute a limitation to the terminal. The terminal may include more or fewer components than shown in the figure, or a combination of some components, or components disposed differently. Details are not described herein again.

It should be understood that, in this embodiment of this application, the input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 701 sends the downlink data to the processor 710 for processing, and in addition, sends uplink data to the network-side device. Generally, the radio frequency unit 701 includes but is not limited to an antenna, at least one amplifier, a transceiver, a coupler, a low noise amplifier, and a duplexer.

The memory 709 may be configured to store software programs or instructions and various data. The memory 709 may primarily include a program or instruction storage area and a data storage area. The program or instruction storage area may store an operating system, an application program or instructions required by at least one function (such as an audio play function or an image play function), and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 710 may include one or more processing units. Optionally, the processor 710 may integrate an application processor and a modem processor. The application processor mainly processes the operating system, a user interface, an application program, an instruction, or the like. The modem processor mainly processes wireless communication. For example, the modem processor is a baseband processor. It can be understood that the modem processor may alternatively be not integrated in the processor 710.

The radio frequency unit 701 is configured to receive first downlink control information DCI or a first medium access control control element MAC CE, where the first DCI or the first MAC CE is used to indicate at least one piece of common beam information, where the common beam information corresponds to at least two channels, or the common beam information corresponds to at least two reference signals, or the common beam information corresponds to at least one channel and at least one reference signal.

In this embodiment of this application, the DCI or the MAC CE is used to indicate the common beam information of the channel and/or reference signal, to reduce signaling overheads of the beam indication. In addition, a feedback mechanism and an effective time scheme for the common beam information are provided. Therefore, robustness of the beam indication method and consistent understanding of beam effectiveness by the network and the terminal are ensured, and system performance is improved.

It should be noted that the terminal provided in this embodiment of this application is a terminal capable of performing the foregoing beam indication method, and all embodiments of the foregoing beam indication method are applicable to the terminal, with the same or similar beneficial effects achieved.

Figure 8:
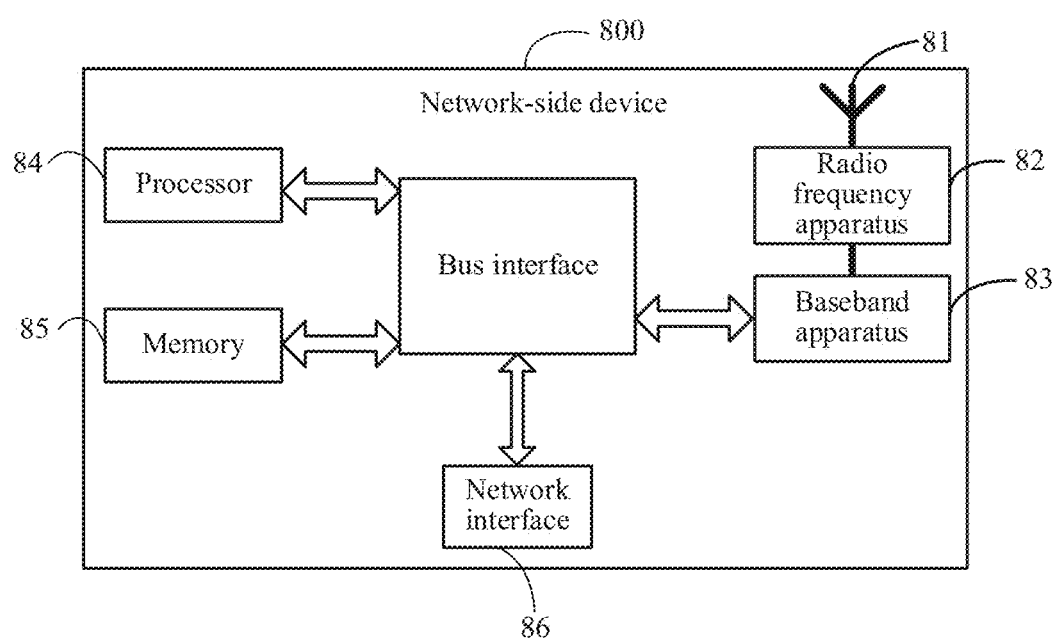
FIG. 8 is a schematic structural diagram of a network-side device according to an embodiment of this application.

For example, an embodiment of this application further provides a network-side device. As shown in FIG. 8, the network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes to-be-sent information, and sends the information to the radio frequency apparatus 82; and the radio frequency apparatus 82 processes the received information and then sends the information out by using the antenna 81.

The frequency band processing apparatus may be located in the baseband apparatus 83. The method performed by the network-side device in the foregoing embodiment may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, connected to the memory 85, to invoke a program in the memory 85 to perform the operation of the network-side device shown in the foregoing method embodiment.

The baseband apparatus 83 may further include a network interface 86, configured to exchange information with the radio frequency apparatus 82, where the interface is, for example, a common public radio interface (CPRI).

For example, the network-side device in this embodiment of this application further includes a program or instructions stored in the memory 85 and executable on the processor 84. When the processor 84 invokes the program or instructions in the memory 85, the method performed by each module shown in FIG. 8 is performed, with the same technical effect achieved. To avoid repetition, details are not described herein again.

An embodiment of this application further provides a non-transitory computer-readable storage medium. The non-transitory computer-readable storage medium stores a program or instructions. When the program or instructions are executed by a processor, each process of the foregoing beam indication method embodiment is implemented, with the same technical effect achieved. To avoid repetition, details are not described herein again.

The processor is a processor in the electronic device in the foregoing embodiment. The non-transitory computer-readable storage medium includes a computer read-only memory (ROM), a random access memory (RAM), a magnetic disk, or an optical disc.

In addition, an embodiment of this application provides a chip, where the chip includes a processor and a communications interface, the communications interface is coupled to the processor, and the processor is configured to execute a program or instructions to implement each process of the foregoing beam indication method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary general hardware platform, and certainly may alternatively be implemented by using hardware. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this application.

It should be understood that division of modules in the foregoing device is merely based on logical functions. In an actual implementation, the modules may be all or partly integrated on a physical entity, and may alternatively be separated physically. In addition, the modules may be all implemented in a form of software invoked by a processing component, or may be all implemented in a form of hardware; or some modules may be implemented in a form of software invoked by a processing component, and some modules may be implemented in a form of hardware. For example, the receiving module may be a processing component that is separately disposed, or may be integrated in a chip of the apparatus for implementation. In addition, the receiving module may be stored in the memory of the apparatus in a form of program code, and is invoked by a processing component of the apparatus to perform a function of the receiving module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processing component, or by using instructions in a form of software.

For example, each module, unit, subunit, or submodule may be configured as one or more integrated circuits for implementing the foregoing method, for example, one or more application-specific integrated circuits (ASIC), or one or more microprocessors (DSP), or one or more field programmable gate arrays (FPGA). In another example, when one of the foregoing modules is implemented in a form of program code invoked by the processing component, the processing component may be a general processor, for example, a central processing unit (CPU) or another processor that may invoke program code. In another example, the modules may be integrated and implemented in a form of a system-on-a-chip (SOC).

The embodiments of this application are described above with reference to the accompanying drawings. However, this application is not limited to the foregoing embodiments. The foregoing embodiments are merely illustrative rather than restrictive. Inspired by this application, persons of ordinary skill in the art can still derive a plurality of variations without departing from the essence of this application and the protection scope of the claims. All these variations shall fall within the protection scope of this application.

The foregoing descriptions are merely implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A beam indication method, performed by a terminal and comprising:

receiving first downlink control information (DCI) or a first medium access control control element (MAC CE), wherein the first DCI or the first MAC CE is used to indicate at least one piece of common beam information; wherein:

the common beam information corresponds to at least two channels, or the common beam information corresponds to at least two reference signals, or the common beam information corresponds to at least one channel and at least one reference signal;

the at least one piece of common beam information indicated by the first DCI or the first MAC CE is applicable to any one of following:

a first-type control resource set; and a first-type control resource set and a channel or reference signal associated with the first-type control resource set; and the method further comprises determining beam information of a second-type control resource set based on a second MAC CE.

2. The method according to claim 1, wherein the channel or reference signal associated with the first-type control resource set comprises at least one of:

a channel or reference signal scheduled by DCI in the first-type control resource set; or a feedback channel corresponding to a channel scheduled by DCI in the first-type control resource set.

3. The method according to claim 1, wherein a control resource set in which the first DCI is located belongs to the first-type control resource set.

4. The method according to claim 1, wherein the receiving first DCI comprises:

determining target beam information based on an indication of a piece of DCI before the first DCI, wherein the target beam information is beam information of the second-type control resource set and a channel or reference signal associated with the second-type control resource set; and receiving a downlink control channel in the second-type control resource set, wherein the downlink control channel comprises the first DCI.

5. The method according to claim 1, wherein after the receiving first DCI or a first MAC CE, the method further comprises:

transmitting first feedback information to a network-side device, wherein the first feedback information is used to indicate whether the terminal has correctly received the first DCI or the first MAC CE.

6. The method according to claim 5, further comprising: determining an uplink resource for the first feedback information in a first manner, wherein the first manner comprises at least one of:

determining the uplink resource for the first feedback information based on an uplink resource that is for the first feedback information and indicated in the first DCI or the first MAC CE;

determining, based on a downlink resource in which the first DCI or the first MAC CE is located and an association relationship between uplink and downlink resources, that an uplink resource associated with the downlink resource in which the first DCI or the first MAC CE is located is the uplink resource for the first feedback information; or determining, based on a transmission time of the first DCI or the first MAC CE and a preset timing relationship, that an uplink resource satisfying the preset timing relationship with the transmission time of the first DCI or the first MAC CE is the uplink resource for the first feedback information.

7. The method according to claim 5, wherein in a case that the first DCI is further used to schedule a physical downlink shared channel (PDSCH), the method further comprises:

transmitting feedback information about the PDSCH; wherein the first feedback information and the feedback information about the PDSCH are jointly indicated in first target feedback information; or the first feedback information and the feedback information about the PDSCH are separately indicated in second target feedback information.

8. The method according to claim 5, wherein in a case that the first DCI is further used to schedule a physical uplink shared channel (PUSCH), an uplink resource in which the first feedback information is located comprises at least one of the PUSCH scheduled by the first DCI;

a PUSCH scheduled by second DCI, wherein the PUSCH scheduled by the second DCI and the PUSCH scheduled by the first DCI use a same hybrid automatic repeat request (HARQ) process number;

first available uplink resource after the PUSCH scheduled by the first DCI; or first available uplink resource after the first DCI.

9. The method according to claim 5, further comprising at least one of:

in a case that the first feedback information is an acknowledgement, after first preset duration from a transmission time of the first feedback information, using the common beam information for a channel or reference signal corresponding to the common beam information; or in a case that the first DCI is further used to schedule a physical uplink shared channel (PUSCH), after second preset duration from a transmission time of second DCI, using the common beam information for a channel or reference signal corresponding to the common beam information, wherein a PUSCH scheduled by the second DCI and the PUSCH scheduled by the first DCI have a same hybrid automatic repeat request (HARQ) process number.

10. The method according to claim 9, wherein in a case that a transmission time of a channel or reference signal scheduled by third DCI precedes a time at which the common beam information becomes usable, the method further comprises:

transmitting, by using first default beam information, the channel or reference signal scheduled by the third DCI, wherein the first default beam information comprises:

beam information corresponding to the transmission time of the channel or reference signal scheduled by the third DCI; or beam information of a control resource set with a smallest identifier (ID).

11. The method according to claim 9, wherein in a case that a transmission time of fourth DCI precedes a time at which the common beam information becomes usable, and a transmission time of a channel or reference signal scheduled by the fourth DCI follows the time at which the common beam information becomes usable, the method further comprises:

transmitting, by using second default beam information, the channel or reference signal scheduled by the fourth DCI, wherein the second default beam information comprises:

beam information corresponding to the transmission time of the fourth DCI;

beam information of a control resource set with a smallest identifier (ID); and the common beam information indicated by the first DCI or the first MAC CE.

12. The method according to claim 5, further comprising:

in a case that the first feedback information is an acknowledgement, transmitting a corresponding channel or reference signal by using the common beam information, or receiving again the first DCI or the first MAC CE indicating the at least one piece of common beam information;

or in a case that the first feedback information is a negative acknowledgement, receiving again the first DCI or the first MAC CE indicating the at least one piece of common beam information.

13. The method according to claim 7, wherein in a case that the first feedback information and the feedback information about the PDSCH are jointly indicated in the first target feedback information, if the first feedback information and the feedback information about the PDSCH are acknowledgements, the first target feedback information is an acknowledgement;

or if at least one of the first feedback information or the feedback information about the PDSCH is a negative acknowledgement, the first target feedback information is a negative acknowledgement.

14. The method according to claim 7, wherein in a case that the first feedback information and the feedback information about the PDSCH are separately indicated in the second target feedback information,
the second target feedback information further comprises first indication information, wherein the first indication information is used to indicate that the second target feedback information comprises the first feedback information or the feedback information about the PDSCH;
or
the second target feedback information further comprises second indication information, wherein the second indication information is used to indicate an arrangement order or position information of the first feedback information in the second target feedback information and the feedback information about the PDSCH in the second target feedback information;
or
at least one of an uplink resource, timing information, a scrambling mode, a time/frequency domain offset, or a code division mode respectively used by the first feedback information and the feedback information about the PDSCH indicates that the second target feedback information comprises the first feedback information or the feedback information about the PDSCH;
or
in the second target feedback information, the first feedback information and the feedback information about the PDSCH are separately encoded and arranged according to a preset rule;
or
in the second target feedback information, the first feedback information and the feedback information about the PDSCH are jointly encoded, wherein a decoding result of joint encoding is able to indicate the first feedback information and the feedback information about the PDSCH that are comprised in the second target feedback information.

15. The method according to claim 5, wherein the transmitting first feedback information to a network-side device comprises:
transmitting the first feedback information by using current beam information, until the common beam information becomes usable;
or
transmitting the first feedback information by using the common beam information.

16. The method according to claim 1, wherein in a case that the first DCI is further used to schedule a physical downlink shared channel (PDSCH), the method further comprises:
receiving again the first DCI indicating the at least one piece of common beam information;
or
receiving again the PDSCH until number of times that no feedback information about the PDSCH is transmitted or number of times that negative acknowledgement feedback information about the PDSCH is transmitted reaches first preset number of times, and receiving again the first DCI indicating the at least one piece of common beam information.

17. The method according to claim 8, wherein in a case that the first DCI is further used to schedule the PUSCH, the method further comprises:
in a case that the terminal does not correctly receive the first DCI, or the terminal does not transmit the first feedback information on the uplink resource in which the first feedback information is located, or the terminal transmits the first feedback information being a negative acknowledgement, receiving again the first DCI indicating the at least one piece of common beam information.

18. A network-side device, comprising: a processor, a memory, and a program or instructions stored in the memory and executable on the processor, wherein the program or instructions, when executed by the processor, cause the network-side device to perform:
transmitting first downlink control information (DCI) or a first medium access control control element (MAC CE), wherein the first DCI or the first MAC CE is used to indicate at least one piece of common beam information; wherein:
the common beam information corresponds to at least two channels, or the common beam information corresponds to at least two reference signals, or the common beam information corresponds to at least one channel and at least one reference signal;
the at least one piece of common beam information indicated by the first DCI or the first MAC CE is applicable to any one of following:
a first-type control resource set; and
a first-type control resource set and a channel or reference signal associated with the first-type control resource set; and
the program or instructions, when executed by the processor, further cause the network-side device to perform: indicating beam information of a second-type control resource set through a second MAC CE.

19. A terminal, comprising: a processor, a memory, and a program or instructions stored in the memory and executable on the processor, wherein when the program or instructions, when executed by the processor, cause the terminal to perform:
receiving first downlink control information (DCI) or a first medium access control control element (MAC CE), wherein the first DCI or the first MAC CE is used to indicate at least one piece of common beam information; wherein;
the common beam information corresponds to at least two channels, or the common beam information corresponds to at least two reference signals, or the common beam information corresponds to at least one channel and at least one reference signal;
the at least one piece of common beam information indicated by the first DCI or the first MAC CE is applicable to any one of following:
a first-type control resource set; and
a first-type control resource set and a channel or reference signal associated with the first-type control resource set; and
the program or instructions, when executed by the processor, further cause the terminal to perform: determining beam information of a second-type control resource set based on a second MAC CE.

* * * * *